(12) United States Patent
DeRose et al.

(10) Patent No.: US 8,035,523 B2
(45) Date of Patent: Oct. 11, 2011

(54) ANTENNA SWITCHING SYSTEM AND METHOD

(75) Inventors: Lynn Ann DeRose, Gloversville, NY (US); Joseph James Salvo, Schenectady, NY (US); Douglas Roy Forman, Niskayuna, NY (US); Janet Sue Bennett, Scotia, NY (US); Brandon Stephen Good, Schenectady, NY (US); Morgan Fredric Intrator, Summit, NJ (US); Nicolas Auguste Constant Schieli, Bietigheim-Bissingen (DE)

(73) Assignee: General Electric Company, Schenectady, NY (US)

( * ) Notice: Subject to any disclaimer, the term of this patent is extended or adjusted under 35 U.S.C. 154(b) by 385 days.

(21) Appl. No.: 12/265,343

(22) Filed: Nov. 5, 2008

(65) Prior Publication Data

US 2010/0109873 A1    May 6, 2010

(51) Int. Cl.
*G08B 13/14* (2006.01)

(52) U.S. Cl. .................. 340/572.7; 340/572.1
(58) Field of Classification Search ............ 340/572.7, 340/572.1; 235/451; 343/745, 748, 893
See application file for complete search history.

(56) References Cited

U.S. PATENT DOCUMENTS

| 6,703,935 | B1 * | 3/2004 | Chung et al. | 340/572.7 |
| 6,943,688 | B2 * | 9/2005 | Chung et al. | 340/572.7 |
| 7,642,917 | B2 * | 1/2010 | Tran | 340/572.7 |
| 7,686,229 | B2 * | 3/2010 | Lyon et al. | 340/572.1 |

* cited by examiner

*Primary Examiner* — John A Tweel, Jr.
(74) *Attorney, Agent, or Firm* — Fletcher Yoder, P.C.

(57) ABSTRACT

An improved RFID tag reader is provided. More specifically, an RFID tag reader is provided that includes a plurality of antenna panels arranged to form a sensing volume in which RFID tags are read. Additionally, the RFID tag reader includes a novel switching mechanism that activates the antenna panels in sequence while minimizing cross coupling between the antenna panels. Furthermore, a novel antenna geometry also reduces antenna cross coupling.

16 Claims, 4 Drawing Sheets

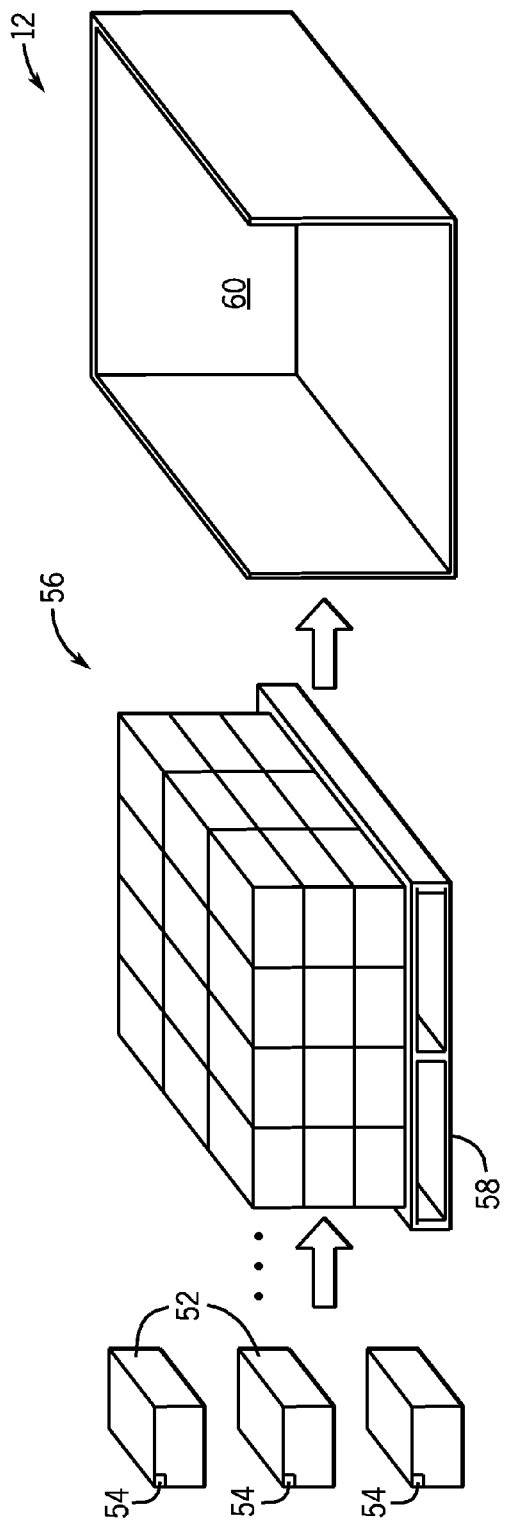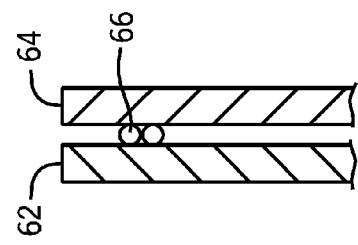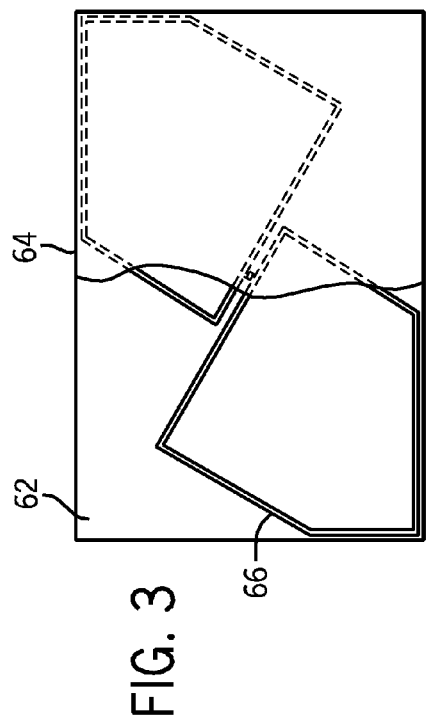
FIG. 2
FIG. 4
FIG. 3

ANTENNA SWITCHING SYSTEM AND METHOD

BACKGROUND

The invention relates generally to RFID readers. More specifically, the invention relates to an RFID reader with an antenna array and an antenna switching unit for selectively coupling or decoupling the antennas in the antenna array.

Identifying and tracking assets is a considerable expense for any business that handles significant volumes of inventory. For example, inventory items that are brought to a storage facility must be identified, categorized and stored so that the items can be readily retrievable, while inventory items that are to be shipped from storage must again be identified to provide an accurate accounting of items remaining in storage. Additionally, entire inventories may need to be periodically recounted to ensure that accounted inventory levels remain accurate over time despite occasional human error. Thus many man-hours of labor may be consumed just in asset tracking alone. Similarly, in shipping applications, large quantities of different items may need to be counted, listed, checked, and manifests or declarations may need to be generated for the shipper, receiver, and customs authorities.

Recent developments in Radio Frequency Identification (RFID) technology may make it possible, however, to greatly decrease the cost of asset tracking. RFID technology utilizes a circuit known as an RF tag, which is capable of carrying a small amount of identification data related to an item to which it is attached. To identify an item, an RF tag reader transmits an RF signal to an RF tag. The RF signal powers the RF tag, inducing the RF tag to transmit a return signal that carries the identification information embedded on the RF tag. By automating most of the asset tracking process, RFID technology can provide a quicker, more accurate and less expensive method of tracking assets.

However, current RFID techniques may not be suitable for certain applications. For example, international RF spectrum regulations often vary greatly, meaning that certain RFID tags may not be usable in all of the countries to which assets might be delivered. Additionally, certain RFID tags may not operate reliably when used with assets that include a number of small metal items. Furthermore, LF (Low Frequency) RFID tags are generally directional and operate over relatively short distances, compared to higher frequency RFID tags.

It may be advantageous, therefore, to provide an RFID tag reading system that is compatible with international RF spectrum regulations, operates effectively over a significant reading range and can read RF tags oriented in any reading direction.

BRIEF DESCRIPTION

Embodiments of the present invention generally relate to RF tag reading systems and methods. Specifically, disclosed embodiments include an RFID reader that includes several RF antennas configured to communicate with RF tags and selection circuitry configured to switch the antennas on or off so that the reader communicates with one antenna or a subset of antennas at a time. Furthermore, disclosed embodiments also relate to selection circuitry configured to selectively decouple an RF antenna from the reading circuitry and alter a resonant response of the antenna when not coupled to the reading circuitry. Furthermore, embodiments of the present invention relate to methods of reading RF tags, including the steps of coupling an antenna to a reader, and altering a resonant response of the antenna to resonate at the reader frequency.

DRAWINGS

These and other features, aspects, and advantages of the present invention will become better understood when the following detailed description is read with reference to the accompanying drawings in which like characters represent like parts throughout the drawings, wherein:

FIG. 2 is a depiction of an RFID tracking process in accordance with embodiments of the present invention.

FIG. 3 is a depiction of an antenna panel in accordance with embodiments of the present invention.

FIG. 4 is cross section of an antenna panel in accordance with embodiments of the present invention.

DETAILED DESCRIPTION

Embodiments of the present invention include a tag reading system 10 configured to operate in the LF frequency band. More specifically, embodiments of a tag reading system operate at or near 125 KHz. Operating a tag reading system in LF frequency band may be advantageous because certain segments of the LF band, such as 125 KHz, are available globally for RFID technology. Additionally, RFID tags in the vicinity of metal or liquids or other conductive materials tend to operate more reliably in the LF frequency band. Embodiments of the present invention also utilize several orthogonally oriented antennas that are activated sequentially. In this way, the effective range of the reader is beneficially extended over a volume, and the reader is able to read tags oriented in any direction.

Figure 1:
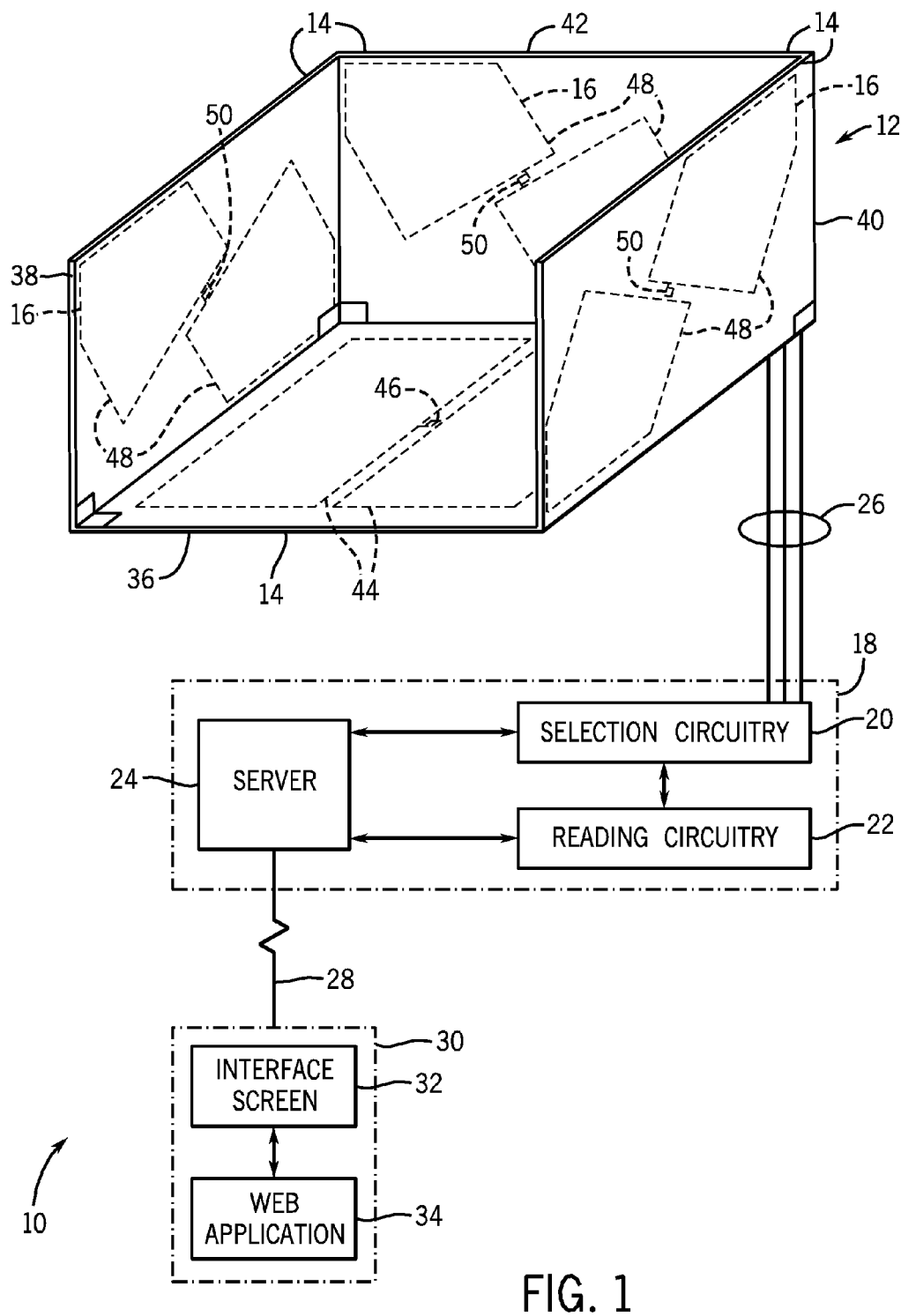
FIG. 1 is a diagram of a tag reading system in accordance with embodiments of the present invention.

FIG. 1 depicts a tag reading system 10 configured to generate asset tracking information in accordance with an embodiment of the present invention. The tag reading system 10 includes an antenna array 12 configured to excite and read RF tags within a volume defined by the antenna array 12. As will be explained further below, the antenna array 12 includes several orthogonally oriented antennas 16 enclosed in panels 14. Some examples of antenna arrays in accordance with the present invention are disclosed in U.S. patent application Ser. No. 11/634,642 filed on Dec. 6, 2006, which is herein incorporated by reference for all purposes.

Also included in the tag reading system is a reader 18. In embodiments of the present invention, the reader 18 is configured to communicate with RF tags in the LF band. The reader 18 may be electrically coupled to the antenna array 12 through a wiring harness 26. The reader 18 controls the reading of RF tags within the volume by sequentially sending electrical signals to each antenna in the antenna array and "listening" for a return signal from any RF tags. To avoid cross-coupling between the antennas, only one antenna or subset of antennas in the antenna array 12 is made operable at any time. The reader 18 is configured, therefore, to switch each antenna on and off in sequence until the entire volume has been "read."

To control the antenna array 12, the reader 18 may include selection circuitry 20 and reading circuitry 22. As will be explained in further detail below, the selection circuitry 20 is configured to sequentially activate the antennas 16 by operably coupling the selected antenna to the reading circuitry 22. In embodiments of the present invention, two or more antennas, such as the side antennas may be activated simultaneously. Once a particular antenna is activated, the reading circuitry 22 sends an excitation signal to the selected antenna and waits for a possible response from any RF tags that may have been activated by the excitation signal. After a certain time period has elapsed, the selected antenna is deactivated, and the next antenna in the sequence is activated. In embodiments of the present invention, each antenna may be active for approximately one second. After all of the antennas 16 have been sequentially activated, the process ends and a full read has been completed.

The reading circuitry may also be configured to recognize duplicate RF tag responses. Recognizing duplicate RF tag responses may be useful because it may be possible for a single RF tag to be excited by more than one antenna. Therefore, any single RF tag may respond multiple times during the read sequence described above. By recognizing duplicate responses, the reading circuitry 22 will be able to compile a more accurate asset list. Typically, the ability of the reader circuitry to recognize duplicate RF tag responses will be facilitated by each RF tag emitting a unique identifier.

Reader 18 also includes a server 24. The server 24 is configured to electronically communicate with both the selection circuitry 20 and the reading circuitry 22 to conduct a full read of the RF tags enclosed by the antenna array 12. The server 24 therefore triggers the reading circuitry 22 to send output RF signals and controls the timing of the selection circuitry 20 to ensure that each antenna 16 participates in the read at the appropriate time.

Also included in the tag reading system 10 is the interface 30. Interface 30 is a user interface configured to allow human control of the tag reading system 10. The interface 30 communicates with the server 24 through the network 28. In alternate embodiments, interface 30 may be included within the reader 18. The interface 30 is configured to allow user control of the tag reading system 10, and may be any form of user interface that facilitates user control of an electronic device. For example, the interface 30 may include an instrument panel and/or a personal computer. Furthermore, the interface 30 may allow a user to load tracking information into a software application, such as a shipping manifest application. Examples of a system that automatically generates a shipping manifest can be found in U.S. patent application Ser. No. 11/438,037, filed on May 22, 2006 and hereby incorporated by reference for all purposes.

The interface 30 may also include an interface screen 32, such as, for example, a touch screen or a computer monitor. The interface screen 32 may be configured to provide feedback regarding the operation of the tag reading system 10. For example, the interface screen 32 may provide information related to the results of a read, error messages, system configuration information, user instructions, etc. The interface 30 may also include a web application 34. The web application may be configured to allow the tag reading system to communicate with remote computers or the Internet. For example, the web application 34 may be configured to allow tracking data to be uploaded to a remote data base or other remote software application.

Returning now to the antenna array 12, a typical tag reading system 10 may include an antenna array 12 with four orthogonal antenna panels 14. Specifically, the antenna array may include a bottom panel 36, two side panels 38 and 40, and a back panel 42. The four orthogonal antenna panels 14 allow the reader to excite and communicate with RF tags enclosed by the antenna array 12 regardless of the orientation of the RF tag. Furthermore, the open configuration of the antenna array 12 allows the user easy access to the volume surrounded by the antenna array 12. Alternate embodiments of the present invention may include an antenna array comprised of only three orthogonal antenna panels, such as, for example, one bottom panel, one back panel and one side panel. In other embodiments, the antenna array may also include five or six antenna panels. In some embodiments, one or more antenna panels may be coupled to the antenna array 12 through the use of a hinge, allowing the antenna panel to swing outward for easier access to the volume enclosed by the antenna array 12.

Included in each antenna panel 14 is an antenna 16. As will be discussed in further detail below, the antenna 16 is constructed of two conductive loops 48. To facilitate the tuning of the antenna 16 to the LF band, each antenna 16 may be fitted with a tuning circuit 50 coupled between the two loops 48 of the antenna 16. Those of ordinary skill in the art will recognize methods of using a tuning circuit 50 to tune the antenna 16 for the LF band.

Turning now to FIG. 2, an exemplary embodiment of an asset tracking procedure is depicted. In a typical asset tracking procedure, several articles 52 are stacked on a pallet 58 and possibly wrapped to keep the articles 52 from shifting or falling. The articles 52 may be any type of articles for which an accounting is to be made, such as, for example, equipment or consumer goods. Furthermore, the articles 52 may be made of any kind of material, including metal or other conductive materials such as containerized liquids.

Each article will typically have an associated RF tag 54 affixed to the article container or the article itself. The RF tag 54 contains electronically encoded information related to the specific article or type of article to which the RF tag is attached. For example, the RF tag 54 may contain UPC codes, serial numbers, model numbers or any other information that can be used to identify the respective article 52.

After the articles 52 are stacked and wrapped, the articles are then lifted by a forklift, for example, into position within the volume 60 enclosed by the antenna array 12. Embodiments of the present invention include a volume 60 that is sized according to a typical pallet width and height. For example, in one embodiment, the volume 60 is approximately four feet (3.25 m) wide, four feet (3.25 m) deep and three feet (1m) high. Alternate embodiments may, however, be sized differently depending on the size of the pallet to be used. It is also important to note that the construction of the antenna array 12 is such that the RF tags 54 do not need to be oriented in any particular fashion. Regardless of the direction an RF tag 54 faces, it will be directed toward at least one of the antenna panels in the antenna array 12. Once inside the volume 60, the read process described in relation to FIG. 1 may be initiated, such that all of the information contained on the RF tags is collected by the reader.

Turning now to FIG. 3 and FIG. 4, a typical antenna panel is shown. The typical panel may include a first layer 62, a second layer 64, and wire loops 66 disposed between the first and second layers to form an antenna. Both the first and second layers may be comprised of any material that is substantially transparent to LF band electromagnetic radiation such as, for example, wood, plastic, fiberglass or other dielectrics. In one embodiment, the first and second layers include ABS plastic. The wire loops 66 may be made of any convenient electrical conductor such as, for example, aluminum or copper. As will be explained in further detail below, the wire loops 66 may be arranged to form a generally pentagonal shape, as shown. However, the wire loops 66 may include any kind of antenna shape or style known in the art such as a dipole, loop, or spiral, for example.

Figure 5:
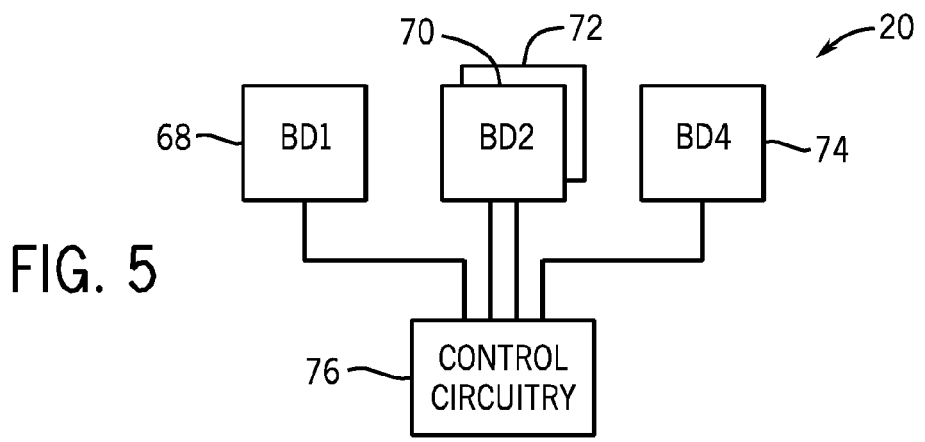
FIG. 5 is a block diagram of an antenna selection circuitry in accordance with embodiments of the present invention.

Turning now to FIG. 5, a schematic of an antenna selection circuitry is shown, in accordance with embodiments of the present invention. Included in the selection circuitry 20 is a control circuitry 76, which triggers the activation of the antennas in the antenna array 12. In a typical embodiment, the control circuitry 76 will be communicatively coupled to the server 24 depicted in FIG. 5. The server 24 thereby controls the selection circuitry by sending electronic commands to the control circuitry 76. In alternate embodiments, the control circuitry may be integrated into the server 24.

Also included in the antenna selection circuitry are the circuit boards 68, 70, 72, and 74, which control the activation of the antennas in the antenna array 12. In embodiments of the present invention, every antenna in the antenna array 12 is electrically coupled to its own circuit board. In some embodiments, however, certain antennas may share circuit boards. Additionally, each circuit board may be incorporated into the antenna panel of the corresponding antenna, or alternatively, each circuit board may be physically coupled within the reader 18 or within a separate circuit board unit.

To activate or deactivate a particular antenna, the control circuitry 76 sends an electronic signal, or command, to the circuit boards 68, 70, 72, and 74, each of which is electrically coupled to a specific antenna in the antenna array 12. As one example, the activation of a particular antenna may be signified by a positive voltage, while deactivation be signified by a zero voltage. As will be explained further below, the circuit board responds to the command from the control circuitry 76 by activating or deactivating the respective antenna. A typical process will include sending a control signal to one circuit board at a time, until a full RFID read has occurred. For example, the control circuitry may send an activation signal to circuit board 68 while sending a deactivation signal to circuit boards 70, 72, and 74. After a read sequence has been performed for the antenna coupled to circuit board 68, the control circuitry may then send a deactivation signal to circuit boards 68, 72, and 74, while sending an activation signal to circuit board 70. The above process repeats until all of the antennas in the antenna array have been sequentially activated. In alternative embodiments, more than one antenna may be activated at a time.

Figure 6:
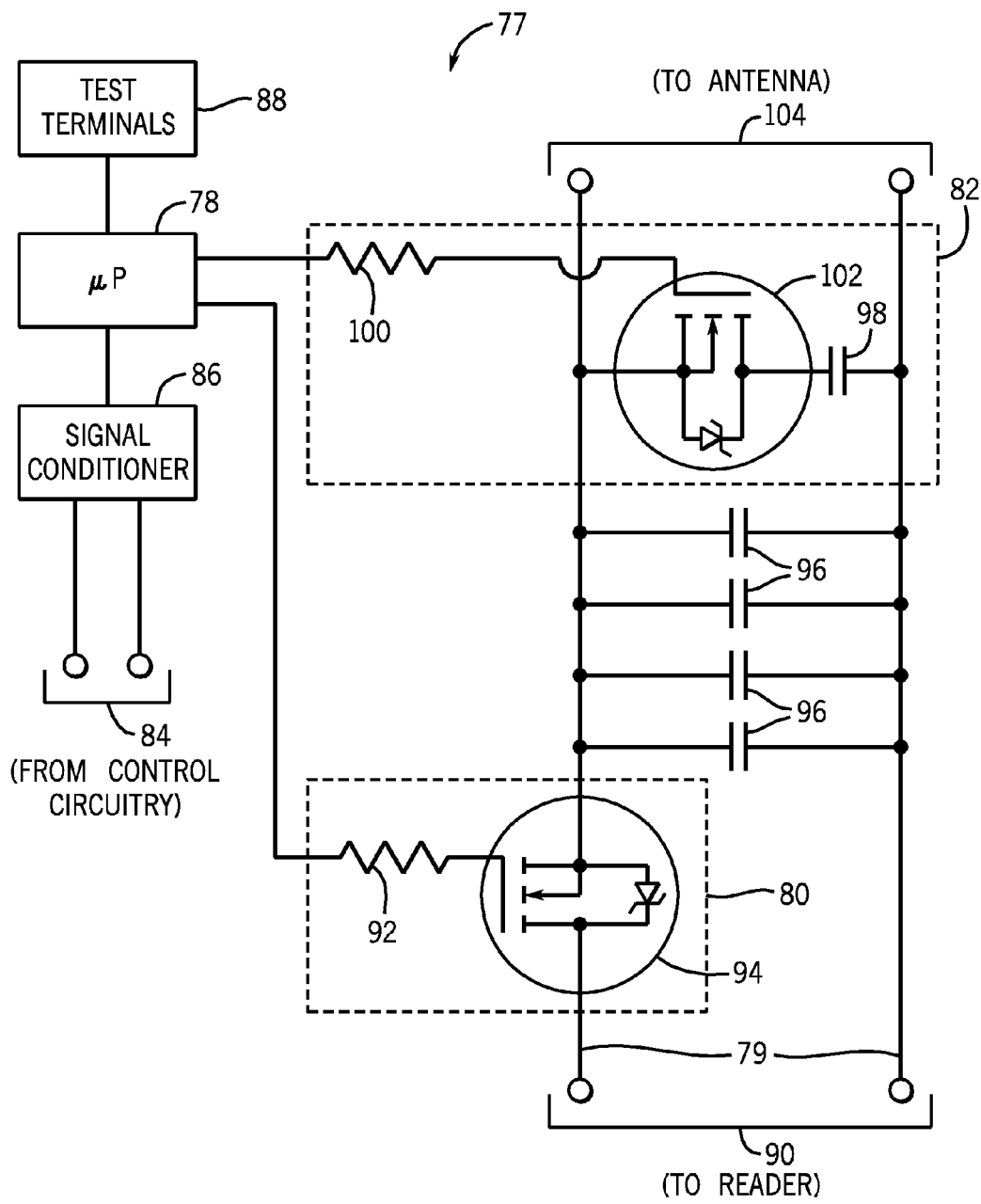
FIG. 6 is a schematic of an activation circuit in accordance with embodiments of the present invention.

Turning now to FIG. 6 a typical activation circuit is depicted. The activation circuit is coupled to the conductive lines 79 that electrically couple the antenna to the reader. The antenna leads 104 couple the activation circuit 77 to the antenna, while the reader leads 90 couple the activation circuit 77 to the reader. The activation circuit 77 is controlled by a microprocessor 78 and includes decoupling circuitry 80 that selectively couples or decouples the antenna from the reader, as well as detuning circuitry 82 that shifts the resonant response of the antenna out of the reader's transmitted frequency so as to avoid crosstalk between the activated antenna and the remaining deactivated antennas in the antenna array.

In the presently contemplated embodiment illustrated, the decoupling circuitry 80 operates by placing an electrical interruption in one of the lines 79 that couple the antenna to the reader. As such, the decoupling circuitry includes a solid state switch 94 in series with one of the lines 79. The solid state switch 94 may be any solid state switch known in the art, such as, for example a power MOSFET. In some embodiments, the decoupling circuitry 80 may include two solid state switches, one for each of the lines 79. Other schemes for decoupling the antennas may also be envisaged.

Moreover, also in the presently contemplated embodiment illustrated, the detuning circuitry 82 operates by adding to the capacitance provided by a set of tuning capacitors 96, which are used to facilitate the tuning of the antenna for when the antenna is activated. The tuning capacitors 96 are coupled in parallel between the lines 79. The capacitance values of the tuning capacitors 96 are chosen to tune the antenna by matching the resonant frequency of the antenna to the radiation frequency generated by the reader. In certain embodiments, the capacitors 96 may be the only capacitors utilized for the tuning of the antenna. In other embodiments, however, a tuning board, including additional capacitors, may also be used to tune the antenna in addition to the capacitors 96. Here again, other schemes for detuning or altering the resonant response of the antennas may be envisaged.

When the antenna is deactivated, the detuning circuitry 82 varies the resonant frequency of the antenna by adding an additional capacitor in parallel with the tuning capacitors 96. As such, the detuning circuitry 82 includes a detuning capacitor 98 that is coupled between the lines 79 through a solid state switch 102. Both the detuning capacitor 98 and the solid state switch 102 are also coupled in parallel with the tuning capacitors 96. The detuning capacitor 98 may be any value that shifts the resonant frequency of the antenna enough that the antenna will not substantially couple energy from the other antennas in the antenna array 12. In some embodiments, the capacitor may have a value of 220 nanofarads. The solid state switch 102 may be any solid state switch known in the art, such as, for example a power MOSFET. When electrical current is applied to the gate of the solid state switch 102, the solid state switch 102 electrically couples the detuning capacitor 98 between the lines 79, thereby adding to the capacitance of the tuning capacitors 96 and thus detuning the antenna.

In some embodiments, the detuning circuitry 82 may include more than one capacitor. Additionally, in some embodiments, the detuning circuitry 82 may shift the resonant frequency of the antenna to a higher frequency. As such the detuning circuitry 82 may include an inductor in place of or in addition to the capacitor 98. Such an inductor may be placed in series with one or both of the conductive lines 79 and similarly coupled to the lines 79 through a solid state switch.

As stated above, both the decoupling circuitry 80 and the detuning circuitry 82 are controlled by the microprocessor 78. Therefore, output lines of the microprocessor 78 are coupled to both the detuning circuitry 82 through resistor 100 and the decoupling circuitry 80 through resistor 92. More specifically, the microprocessor is coupled to the gates of both of the solid state circuits 94 and 102. Coupled to an input line of the microprocessor 78 is a signal conditioner 86, that modifies the electrical format of the input 84 received from the control circuitry 76. Signal conditioner 86 may include any component or combination of components useful for adapting the output of the controller to the input of the microprocessor 84, such as, for example, transceivers and operational amplifiers. Also coupled to the microprocessor are test terminals 88 that are used for debugging purposes. Those of ordinary skill in the art will recognize various ways of coupling the test terminals 88 to the microprocessor so as to facilitate debugging.

During a typical read sequence, an electrical signal will be received from the control circuitry through the input 84. The signal conditioner 86 then converts the signal into an electrical format suitable for the microprocessor 78. If the signal received by the activation circuitry corresponds with a deactivation command, the respective antenna will be deactivated. Specifically, the microprocessor will turn off solid state switch 94 and turn on solid state switch 102. Turning off solid state switch 94 decouples the antenna from the reader, while turning on solid state switch 102 changes the resonant frequency of the antenna so that the antenna will not couple significant energy from the antenna in the antenna array 12 that is active. If, however, the signal received by the activation circuitry corresponds with an activation command, the respective antenna will be activated. Specifically, the microprocessor will turn on solid state switch 94 and turn off solid state switch 102. Turning on solid state switch 94 couples the antenna to the reader while turning off solid state switch 102 returns the resonant frequency of the antenna back to a tuned state. In embodiments of the present invention, the switching described above effectively occurs simultaneously.

Figure 7:
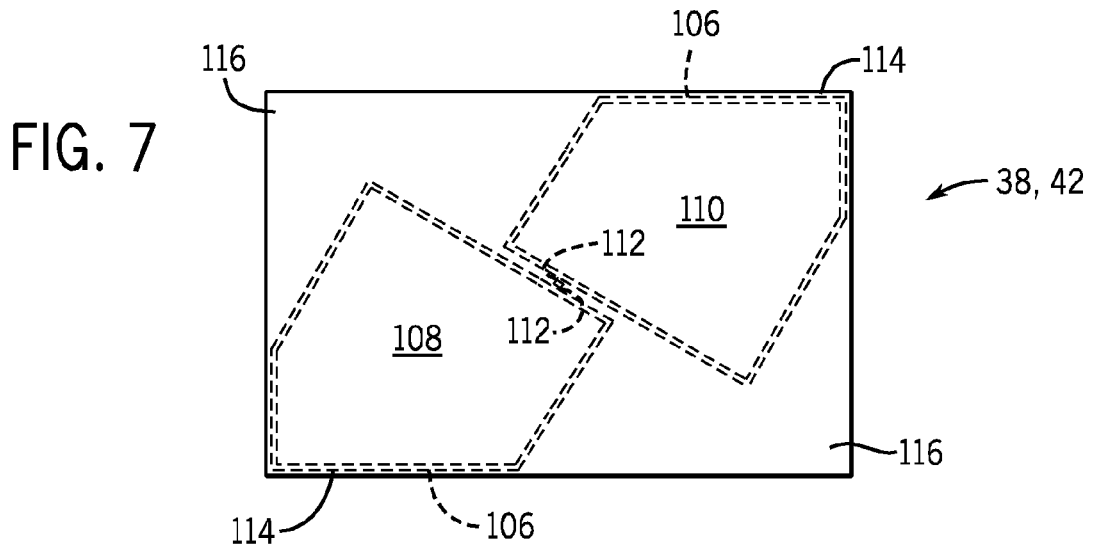
FIG. 7 is a depiction of a side antenna panel in accordance with embodiments of the present invention.

Turning now to FIG. 7 an antenna panel is shown representing a typical side panel 38 and back panel 42. The typical side and back panel 38 and 42 includes an antenna constructed of two conductive loops 108 and 110 coupled to a tuning board through leads 112. Each of the conductive loops 108 and 110 may include one or more loops of conductive wire. In embodiments of the present invention, both conductive loops 108 and 110 include two loops of conductive wire arranged in a pentagonal pattern 106, which serves to reduce cross coupling between adjacent antenna panels. The pattern 106 reduces cross coupling because the antenna pattern 106 fills the two panel corners 114 while creating a relatively open space at the other two panel corners 116. It will be appreciated, therefore, that when two of the depicted panels is placed side by side, corners 114 will be adjacent to corners 116, thus reducing the spacing between conductors in adjacent panels and, therefore, also reducing cross coupling.

Figure 8:
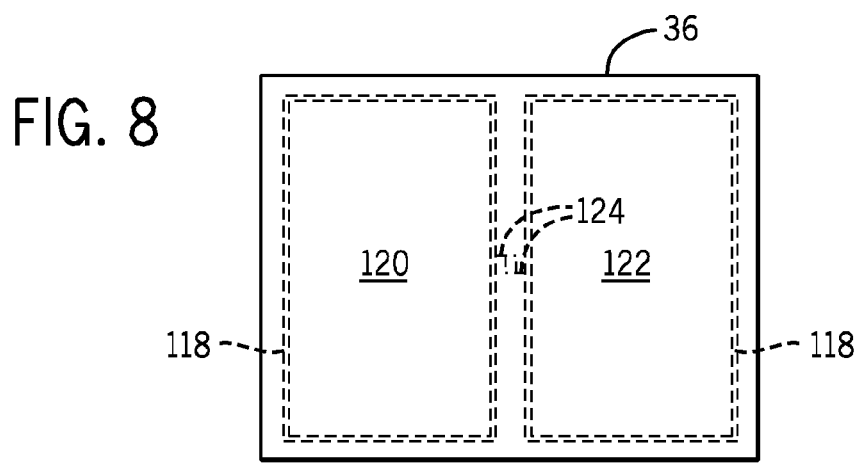
FIG. 8 is a depiction of a bottom antenna panel in accordance with embodiments of the present invention.

Turning now to FIG. 8, a typical bottom panel 36 is shown. The bottom panel 36 also includes an antenna constructed of two conductive loops 120 and 122 coupled to the tuning board through leads 124. Each of the conductive loops 120 and 122 may include one or more loops of conductive wire. In embodiments of the present invention, both conductive loops 120 and 122 include two loops of conductive wire arranged in a rectangular pattern 118.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A radio frequency tag reading system comprising:
a plurality panels, each panel comprising:
four panel corners; and
a radio frequency antenna comprising two conductive wire loops of conductive wire arranged in a pentagonal pattern, filling two of the panel corners while leaving a relatively open space at the other two panel corners; wherein the radio frequency antennas are configured to excite and read radio frequency tags; and
reader circuitry coupled to the antennas and including radio frequency signal reading circuitry and selection circuitry configured to selectively couple the radio frequency signal reading circuitry to each antenna and to alter a resonant response of each antenna when not coupled to the radio frequency signal reading circuitry.

2. The system of claim 1, comprising three radio frequency antennas disposed in generally orthogonal orientations around a sensing volume.

3. The system of claim 2, comprising a fourth radio frequency antenna disposed generally parallel to one of the three radio frequency antennas around the sensing volume.

4. The system of claim 1, wherein the reader circuitry includes a separate selection circuit for each radio frequency antenna.

5. The system of claim 1, comprising control circuitry configured to signal the selection circuitry to couple a selected one of the radio frequency antennas to the radio frequency signal reading circuitry and to decouple other non-selected radio frequency antennas from the radio frequency signal reading circuitry.

6. The system of claim 1, wherein selection circuitry includes a processor and a pair of solid state switches, the processor being configured to change conductive states of the solid state switches to couple a selected radio frequency antenna to the radio frequency signal reading circuitry and to decouple non-selected radio frequency antennas from the radio frequency signal reading circuitry, and to alter the resonant response of the non-selected antennas.

7. The system of claim 1, wherein the antennas and the reader circuitry are configured to operate at a nominal excitation frequency of 125 kHz.

8. The system of claim 1, wherein the selection circuitry alters the resonant response of each antenna by switching a capacitor across the respective antenna.

9. A radio frequency tag reading system comprising:
at least three radio frequency antenna panels disposed about a sensing volume having one or more radio frequency tags, each antenna panel comprising:
first and second layers of LF band electromagnetic radiation transparent materials, each layer forming four panel corners; and
a radio frequency antenna disposed between the first and second layers comprising two conductive wire loops of conductive wire filling two of the panel corners while leaving a relatively open space at the other two panel corners.

10. The system of claim 9, comprising three antenna panels with three radio frequency antennas disposed in generally orthogonal orientations around the sensing volume.

11. The system of claim 10, comprising a fourth antenna panel with a radio frequency antenna disposed generally parallel to one of the three radio frequency antennas of the antenna panels disposed about the sensing volume.

12. A method for reading radio frequency tags, comprising:
coupling a first radio frequency antenna that fills two corners of a first antenna panel and leaves two open corners of the first antenna panel to a reading circuitry;
coupling a second radio frequency antenna that fills two corners of a second antenna panel and leaves two open corners of the second antenna panel to a reading circuitry;
placing the second antenna panel next to the first radio frequency antenna panel in an orthogonal direction such that one of the filled corners of the first antenna panel is adjacent to one of the open corners of the second antenna panel;
tuning the first radio frequency antenna so that the resonant response of the first radio frequency antenna significantly matches the signal frequency generated by the reading circuitry;
sending radio frequency signals from the reading circuitry to the first radio frequency antenna;

electrically decoupling the first radio frequency antenna from the reading circuitry;

detuning the first radio frequency antenna so that the resonant response of the first radio frequency antenna does not significantly match the signal frequency generated by the reading circuitry;

tuning the second radio frequency antenna so that the resonant response of the second radio frequency antenna significantly matches the signal frequency generated by the reading circuitry;

sending radio frequency signals from the reading circuitry to the second radio frequency antenna.

13. The method of claim 12 comprising, receiving radio frequency signals from the first radio frequency antenna, the radio frequency signals corresponding to radio frequency tags in wireless communication with the first radio frequency antenna.

14. The method of claim 12, wherein the first and second radio frequency antennas are orthogonally positioned relative to a third radio frequency antenna.

15. The method of claim 12, comprising electrically decoupling the second radio frequency antenna from the reading circuitry;

detuning the second radio frequency antenna so that the resonant response of the second radio frequency antenna does not significantly match the signal frequency generated by the reading circuitry;

coupling a third radio frequency antenna to the reading circuitry;

tuning the third radio frequency antenna so that the resonant response of the third radio frequency antenna significantly matches the signal frequency generated by the reading circuitry;

sending radio frequency signals from the reading circuitry to the third radio frequency antenna.

16. The method of claim 12, comprising receiving radio frequency signals from the second radio frequency antenna, the radio frequency signals corresponding to radio frequency tags in wireless communication with the second radio frequency antenna.

* * * * *